United States Patent

Suonperä et al.

[11] Patent Number: 5,651,875
[45] Date of Patent: Jul. 29, 1997

[54] PROCESS FOR PRODUCING ALKALI METAL HYDROXIDE

[75] Inventors: Timo Kullervo Suonperä, Haukipudas; Keijo Allan Ukkonen; Erkki Matti Keskitalo, both of Oulu, all of Finland

[73] Assignee: EKA Chemicals OY, Oulu, Finland

[21] Appl. No.: 558,350

[22] Filed: Nov. 16, 1995

Related U.S. Application Data

[63] Continuation of Ser. No. 301,839, Sep. 7, 1994, abandoned, which is a continuation of Ser. No. 28,467, Mar. 9, 1993, abandoned.

[30] Foreign Application Priority Data

Mar. 13, 1992 [FI] Finland .................................. 921108
Feb. 19, 1993 [FI] Finland .................................. 9307518

[51] Int. Cl.$^6$ ........................................... C25B 1/34
[52] U.S. Cl. .................. 205/510; 205/508; 205/516
[58] Field of Search ........................... 205/500, 502, 205/508, 510, 512, 516; 423/475, 499.1, 499.4

[56] References Cited

U.S. PATENT DOCUMENTS 4,752,363  6/1988  Buckley et al. .......................... 204/98

FOREIGN PATENT DOCUMENTS 0024024  of 1915  United Kingdom .................. 423/487

Primary Examiner—Kathryn L. Gorgos
Assistant Examiner—Alex Noguerola
Attorney, Agent, or Firm—Pennie & Edmonds LLP

[57] ABSTRACT

The invention concerns a method for producing an alkali metal hydroxide by a chlor-alkali electrolysis (1), wherein an alkali metal chloride solution is electrolyzed in order to form alkali metal hydroxide, chlorine and hydrogen, wherein at least a part of the alkali metal chloride used in the electrolysis is prepared by neutralizing (2) an alkali metal carbonate with chlorine or hydrogen chloride.

25 Claims, 3 Drawing Sheets

PROCESS FOR PRODUCING ALKALI METAL HYDROXIDE

This is a continuation of application Ser. No. 08/301,839, filed Sep. 7, 1994, now abandoned, which is in turn a continuation of application Ser. No. 08/028,467, filed Mar. 9, 1993, now abandoned.

FIELD OF THE INVENTION

The invention concerns a method for producing an alkali metal hydroxide by chlor-alkali electrolysis wherein an alkali metal chloride solution is electrolyzed to form an alkali metal hydroxide, chlorine and hydrogen.

BACKGROUND OF THE INVENTION

A problem of the chlor-alkali industries in many countries is the imbalance between the demands for the alkali metal hydroxide and chlorine which are the main products of the electrolysis. It is expected that the balance will get even worse in the future because of the environmental pressure caused by the use of chlorine and its finished products. The result of this is that alternative methods for producing alkali metal hydroxides have to be found, because they can't be produced in adequate quantities by the conventional chlor-alkali electrolysis.

Other known methods for producing alkali metal hydroxides include the following methods:

chemical decarbonation of soda with either lime milk or ammonia, electrolytical breaking down of an alkali metal sulphate to an alkali metal hydroxide and sulphuric acid, decarbonation of soda with an acid solution of an alkali metal sulphate and the electrolysis of so obtained sulphate solution to an alkali metal hydroxide, catalytical breaking down of an alkali metal sulphide to an alkali metal hydroxide and sulphur dioxide and electrolytical breaking down of an alkali metal chlorate to an alkali metal hydroxide and chlorine dioxide.

The chlorate is generally produced by electrical breaking down of alkali metal chlorides.

All of these known methods are unfavorable for the present producers of alkali metal hydroxide. The disadvantages of the most common alternative processes are the following: too much of sulphur compounds are produced as by-products in the process, having no use in a large scale; the raw material and energy costs of the process are too high compared to the market price of the product; big investments are required in the process and thus its capital costs are getting unfavorable in proportion to the market price of the product.

SUMMARY OF THE INVENTION

The intention of the invention is to provide a method for producing an alkali metal hydroxide, with which method the above disadvantages of the known methods are avoided and which can be carried out in chlor-alkali plants wherein additionally the ratio of the alkali metal hydroxide and the chlorine produced in the chlor-alkali electrolysis can be controlled to a desired level, and which method can additionally produce hydrogen and according to one embodiment also alkali metal chlorate, which products can be further utilized.

The principal characteristic features of the invention appear from the appended claims.

The invention resides in the realization that at least a part of the alkali metal chloride used in the chlor-alkali electrolysis can be produced by neutralizing or decarbonating an alkali metal carbonate either with chlorine or gaseous hydrogen chloride. By the decarbonation of an alkali metal carbonate with chlorine in an aqueous solution an alkali metal chlorate is at the same time formed.

By "alkali metal" it is in this connection primarily meant sodium and potassium, especially sodium.

When chlorine is used in the neutralization, the reaction products of the neutralization of an alkali metal carbonate in an aqueous solution are carbon dioxide, an alkali metal chloride and chlorate.

When hydrogen chloride is used in the neutralization, the reaction products of the neutralization of an alkali metal carbonate are carbon dioxide, an alkali metal chloride and water.

According to one preferred embodiment, the alkali metal carbonate and chloride are fed in the neutralization stage to the reactor which contains water or a solution of an alkali metal chloride or an alkali metal chlorate and an alkali metal chloride. When neutralizing an alkali metal carbonate with chlorine, an alkali metal chloride and chlorate are formed. The solution is becoming supersaturated in respect of the chloride, and hence, the alkali metal chloride can be separated from the solution as crystals. This alkali metal chloride is then used in a traditional way in the electrolysis in order to produce chlorine, alkali metal hydroxide and hydrogen. Preferably, at least a part of the chlorine is circulated back to the above mentioned reactor. In order to avoid the supersaturation of the reactor solution in respect of chlorate, a side stream is taken out from the reactor to the extended handling of chlorate.

The crystalline alkali metal chloride obtained from the reactor is preferably dissolved to the liquid circulation of the chlor-alkali plant, i.e., to the diluted alkali metal chloride solution which is leaving the chlor-alkali electrolysis, wherein the concentration of the obtained solution is preferably near that of a saturated solution. This solution is, after purification, returned to the chlor-alkali electrolysis.

According to a second preferred embodiment of the invention, an alkali metal carbonate and chlorine are mixed in the neutralization stage to the diluted alkali metal chloride solution leaving the chlor-alkali electrolysis. An alkali metal chloride and chlorite are formed in the neutralization of the alkali metal carbonate by chlorine. The alkali metal chlorate is removed from the solution obtained or changed to the desired product by a known method, and the concentrated alkali metal chloride solution thus obtained is, after purification, returned to the chlor-alkali electrolysis to produce alkali metal hydroxide, chlorine and hydrogen. Preferably, at least a part of the obtained chlorine is fed to the above mentioned neutralization stage.

According to a third preferable embodiment of the invention, the neutralization is carried out by adding the alkali metal carbonate to the alkali metal chloride solution which is leaving the electrolytic cells, to which alkali metal chloride solution gaseous hydrogen chloride has been absorbed, and the alkali metal chloride solution thus obtained is then fed, after purification, to the electrolytic cells.

According to a fourth preferable embodiment of the invention, the neutralization is carried out by adding the alkali metal carbonate to the alkali metal chloride solution which is leaving the electrolytic cells and by neutralizing the carbonate thereafter with hydrogen chloride gas, and the alkali metal chloride solution thus obtained is then, after purification, fed to the electrolytic cells.

According to a fifth preferable embodiment of the invention, the neutralization is carried out in a closed circulation containing initially either water or alkali metal chloride solution. To this circulation, there is then added alkali metal carbonate and either hydrogen chloride gas or hydrochloric acid. When the alkali metal carbonate is decarbonated, the solution is becoming supersaturated in respect to alkali metal chloride which can then be separated from the solution as crystals. These crystals are then led to the solution circulation of the chlor-alkali electrolysis in order to produce chlorine, an alkali metal hydroxide and hydrogen.

Consequently, in the neutralization zone, there is produced the alkali metal chloride solution of a conventional chlor-alkali plant, which alkali metal chloride solution is purified by known processes depending on the electrolytic cell method in question.

The alkali metal chloride solution to be fed to the chlor-alkali, electrolysis is preferably nearly saturated.

The pH value of the solution in the neutralization is preferably over 3 and especially between 3 and 11.

The neutralization can be carried out either continuously or batchwise at a broad temperature range which is preferably between 20° C. and 100° C. When chlorine is used in the neutralization, the alkali metal chlorate and chloride concentrations in the solution produced is influenced by the temperature. The neutralization can be carried out in one or several stages.

According to the method of the invention, the alkali metal chloride is electrolyzed in a known manner in the electrolytic cells in order to produce the alkali metal hydroxide. The electrolysis can be carried out in mercury cathode, diaphragm or membrane cells. The quality of the alkali metal hydroxide solution obtained after the electrolysis is equivalent to the quality obtained by the conventional chloride method.

The chlorine gas used in the neutralization of the alkali metal carbonate is preferably produced by the electrolysis. Chlorine is decarbonating a natural carbonate in the solution forming again alkali metal chloride, alkali metal chlorate and carbon dioxide. The carbon dioxide can be purified further and liquefied in a known manner for further use. The alkali metal chlorate can be fed to the preparation of alkali metal chlorate, or to a process where alkali metal chlorate is spent, or it can be changed to a chloride solution with hydrochloric acid, or it can be destroyed, or it can be refined further by some other desired way.

Hydrogen chloride which is used in the neutralization of alkali metal carbonate is preferably produced from the chlorine and hydrogen gases produced in the synthesis apparatus, to which also a known excess of hydrogen gas needed for the hydrogen chloride synthesis is led. After the synthesis, the obtained hydrogen-containing hydrogen chloride gas can be absorbed in a known manner either in water or a diluted hydrochloric acid solution. By heating a concentrated hydrochloric acid solution, a pure hydrogen chloride gas is provided which is absorbed to the diluted alkali chloride solution leaving the electrolysis cells. The obtained acidic chloride solution is decarbonating the natural carbonate, forming again alkali metal chloride and carbon dioxide. The carbon dioxide can be purified further and liquefied in a known manner for further use.

A remarkable advantage of the present invention is that already existing but underutilized chlor-alkali plants can be utilized in the process. By controlling the amount of the alkali metal carbonate, it is, according to the invention, possible to influence how much of the chlorine produced by the electrolysis remains as a saleable product of the process. One of the essential characteristics of the invention is particularly that the ratio of saleable chlorine the alkali metal hydroxide can be regulated steplessly from about 0% to nearly 100% by varying the amount of salt obtained from the alkali metal carbonate and to be fed to the process. The rest of the alkali metal chloride needed in the electrolysis is provided by feeding new alkali metal chloride to the solution circulation.

Another important advantage of the invention is that in the chlorination of the carbonate, chlorate is preferably formed which can be utilized easily and economically. By adjusting the temperature in the reactor, the chlorate and chloride contents of the obtained solution can be influenced to obtain a composition of the solution which is best suited for the intended use.

A third important advantage of the invention is that the hydrogen formed in the chlor-alkali electrolysis can advantageously be utilized either in other chemical processes or pro-environmentally as a fuel in the energy production.

The neutralization degree of the alkali metal carbonate can be adjusted by adjusting the amount of chlorine or hydrogen chloride and, hence, to provide suitable conditions in respect of the purification and electrolysis of the alkali metal chloride solution.

Among the most remarkable advantages in respect of the existing chlor-alkali plants the following can be mentioned: in the method according to the invention a cheap, even unrefined alkali metal carbonate can be used which is suitable for electrolytic use. Noxious sulfur compounds are not produced in the method as by-products. The existing capacity-of an electrolytic cell can be utilized to its full value. The investments which the method needs in existing plants are very small compared to alternative processes with the same production capacity of alkali metal hydroxide. The method is very flexible when the the production demand for chlorine and lye is changing. The production costs of the alkali metal hydroxide realized by means of the present invention are very low compared to the alternative processes. When chlorine is used to the neutralization the method is producing chlorate and hydrogen as by-products which can be utilized economically, and hence the method is economically more uniform.

BRIEF DESCRIPTION OF THE INVENTION

The invention is now illustrated in more detail in connection of the appended Figures wherein.

DETAILED DESCRIPTION OF THE INVENTION

Figure 1:
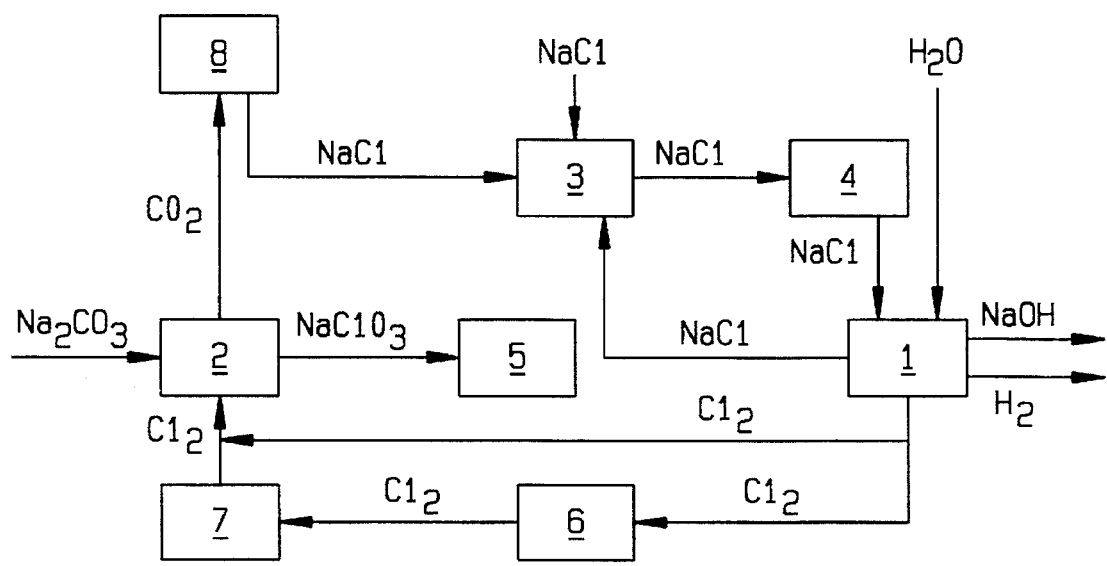
FIG. 1 is a block diagram showing the principles of the production of an alkali metal hydroxide according to the invention, as adapted for the production of lye.

In FIG. 1 the electrolysis is marked with the reference numeral 1 to the electrolysis cell, there fed a sodium chloride solution through the purification zone 4. From the electrolysis cell 1, the desired sodium hydroxide solution and hydrogen are obtained which can be treated further in a method which is known per se. The chlorine gas produced by the electrolysis cell 1 is transported to the reactor 2, where the chlorine gas can also be taken through liquefication 6 and vaporization 7. In reactor 2, the sodium chloride crystal formed as the reaction product of chlorine and soda is separated from the reactor solution and is at saturating station 3 dissolved to the diluted salt solution returning from the electrolysis cell 2 and where also additional sodium chloride is added as needed. The saturated salt solution is led from the saturating station 3 to the purification zone 4, and from there further to the electrolysis cell 1. In reactor 2 there are also carbon dioxide $CO_2$ and sodium chlorate, which are led to the extended treatments 5 and 8. The extended treatment 5 can be a separating of sodium chlorate from the solution or its utilization as such in other processes.

Figure 2:
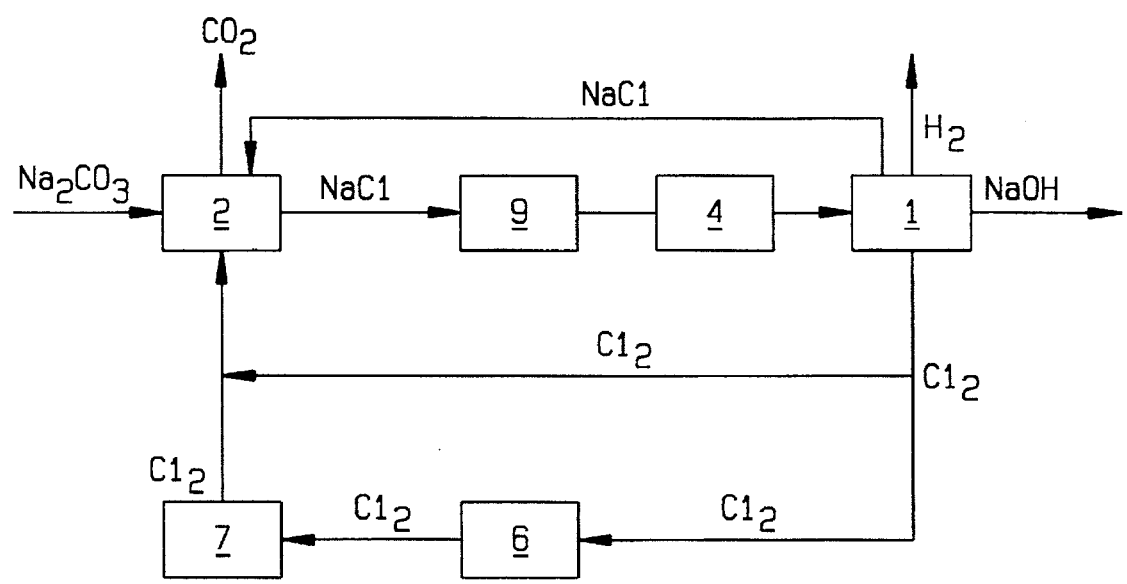
FIG. 2 is a block diagram showing the principles of a second production of an alkali metal hydroxide according to the invention, as adapted for the production of lye.

In FIG. 2 a sodium chloride solution is fed to the electrolysis cell 1 through the purification 4. From the electrolys cell 1, the desired sodium hydroxide solution and hydrogen are obtained, which can be further treated by a method known per se. The sodium carbonate, and chlorine produced by the electrolysis cell 1, are fed directly to the solution circulation of the chlor-alkali electrolysis in reactor 2. The chlorine gas can also be led to the reactor 2 through liquefication 6 and vaporization 7. In reactor 2, the chlorate formed to the solution circulation is transformed by a known method to a desired compound at point 9, from where the concentrated salt solution is led to the purification zone 4 and from there, further to the electrolysis cell 1. When chlorine is desired as a sales product, additional sodium chloride is added to the solution circulation e.g. at point 2.

Figure 3:
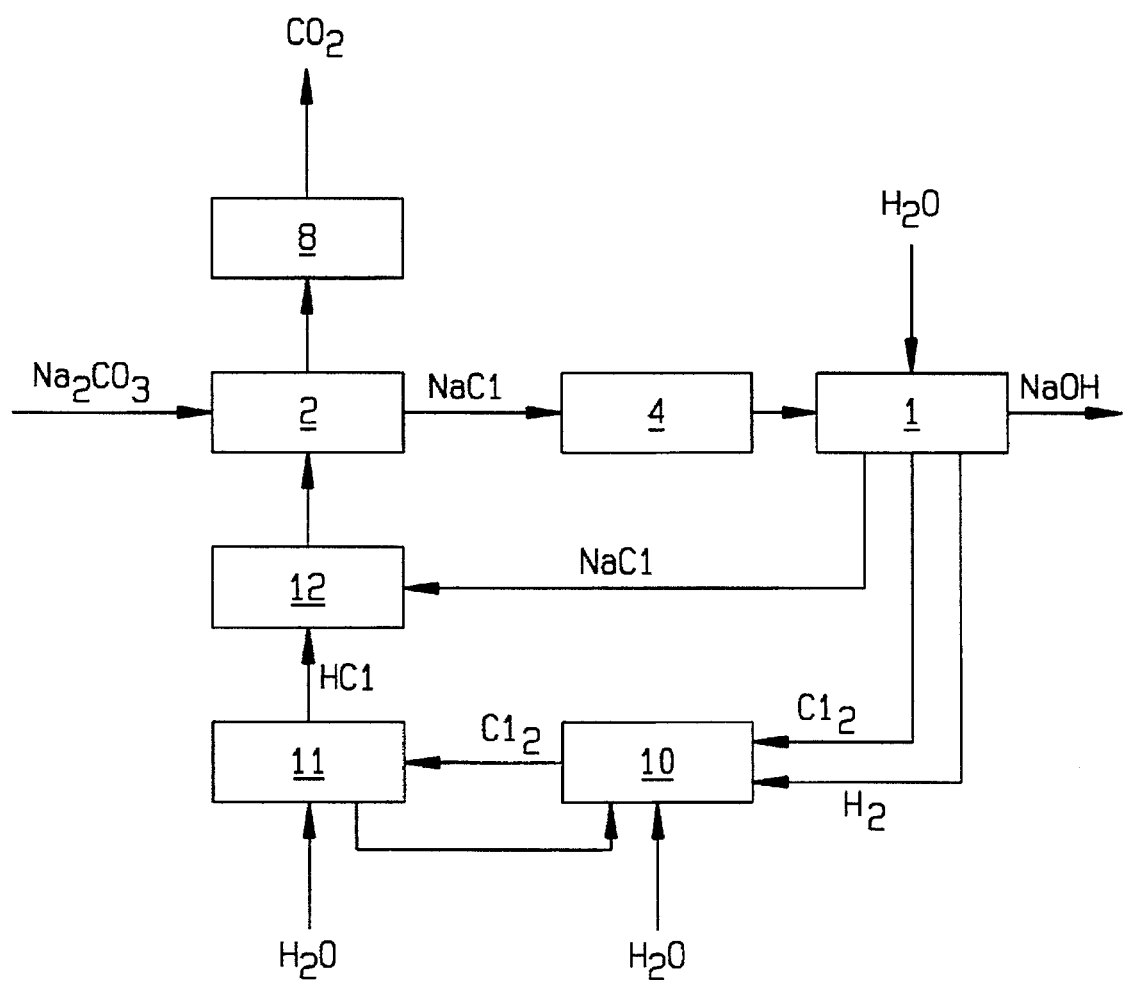
FIG. 3 is a block diagram showing the principles of a third production of an alkali metal hydroxide according to the invention, as adapted for the production of lye.

In FIG. 3, the electrolysis cell is indicated by the reference numeral 1. To the electrolysis cell a sodium chloride solution is fed which has been obtained from the sodium chloride purification zone 4. From the electrolysis cell 1, a desired sodium hydroxide solution is obtained which can be treated further by a known method. The chlorine and hydrogen gases produced by the electrolysis cell 1 are taken to the hydrochloric acid synthesis zone 10, from where the hydrochloric acid is led to the separation of hydrogen chloride gas 11. The pure hydrogen chloride gas obtained is absorbed in the absorption of hydrogen chloride 12 to the diluted sodium chloride solution which is leaving the electrolysis cell. The acidic sodium chloride solution obtained is led to the neutralization zone 2, where even soda is fed. In the neutralization zone 2 the acidic chloride solution is decarbonating the soda wherein sodium chloride is formed which is lea to the purification zone of the sodium chloride 4, and carbon dioxide, which is fed to the purification zone of carbon dioxide 8.

Figure 4:
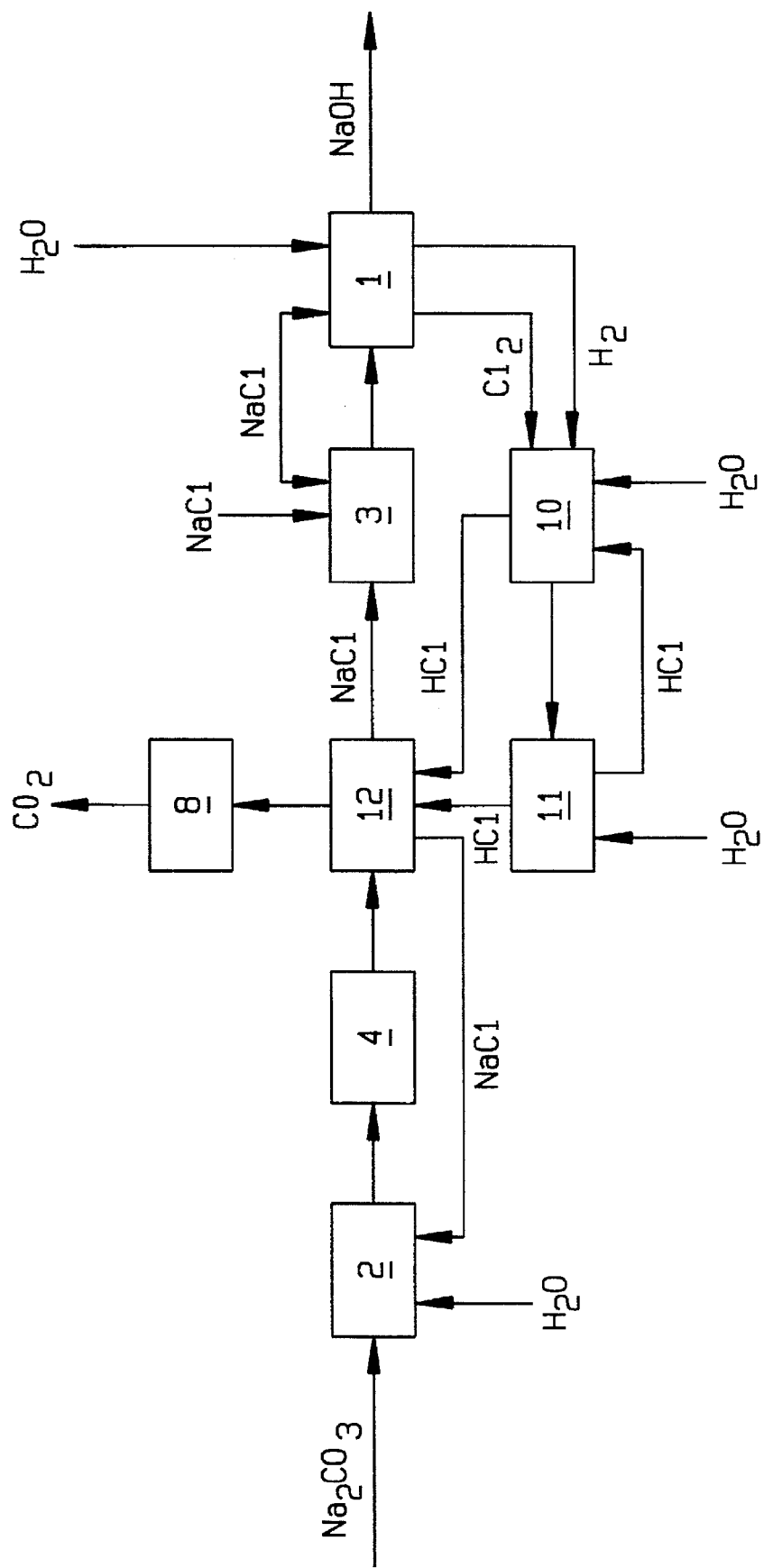
FIG. 4 is a block diagram showing the principles of a fourth production of an alkali metal hydroxide according to the invention, as adapted for the production of lye.

In FIG. 4, the electrolysis cell is indicated by the reference numeral 1. In it, a sodium chloride solution is fed from the saturation zone 3, to which, when producing chlorine to be sold, external sodium chloride is brought. From electrolysis cell 1, a desired sodium hydroxide is obtained which can be treated further by a method known per se. The chlorine and hydrogen gases produced by electrolysis cell 1 are taken to the hydrochloric acid synthesis 10. From here, the hydrochloric acid can be led as such or through the vaporization zone 11 to the reactor 12. In reactor 12, the hydrochloric acid is decarbonating soda forming sodium chloride, carbon dioxide and water. The solution will become supersaturated in respect to of chloride, and sodium chloride can be separated from the solution as crystals. These crystals are then led to the saturation 3. From the reactor 12, the salt solution is returned to the dissolution of soda 2, from where it is led further through the purification 4 to the reactor 12. The carbon dioxide formed is purified in point 8 and is led to further treatment.

The workability of the process has been tested with several laboratory scale tests. In these tests the goal has been to find out the influence of temperature, pH and different concentrations on the progress of the reaction. According to the results, chlorine is produced five or over five times as much as chlorate. The end-pH is, depending on the chlorination degree, over 3. According to the chlorate/chloride-solubility curve, the temperature and concentrations have a correlation which dictates the composition of the solution to be removed from the reactor.

In the following the invention is explained with examples.

EXAMPLE 1

An amount of 250 ml of a solution was taken, containing

NaCl 170 g/l $NaClO_3$ 400 g/l $Na_2CO_3$ 50 g/l

Temperature <30° C.

Chlorine gas was fed through this solution until all sodium carbonate had reacted with chlorine. The residual chlorine was destroyed from the solution thus obtained by mixing. The chlorinated solution and the crystals formed were analyzed. As a result, a solution was obtained containing NaCl 185.2 g/l $NaClO_3$ 406.2 g/l 9.3 g of a crystalline salt was obtained, containing 0.42 g $NaClO_3$ and 8.92 g NaCl. The final pH was 4.7

EXAMPLE 2

Into 1 liter of water, 100 g $Na_2CO_3$ was dissolved. The pH of the obtained solution was 10.2. This solution was chlorinated until $Na_2CO_3$ had been spent. As a result, a solution was obtained containing 83.9 g NaCl, 25.5 g $NaClO_3$ and 5.5 g active chlorine. The final pH was 6.2

EXAMPLE 3

One thousand milliliters of a sodium chloride solution was taken having a temperature of 65° C. and concentration 253 g NaCl/l. To the solution, 30 g hydrogen chloride gas was slowly absorbed which had been produced by heating a 33% hydrochloric acid. To the acidic salt solution, 45 g of technical sodium carbonate having a concentration of 99.3% $Na_2CO_3$ was slowly added. After cessation of the carbon dioxide evolution, a salt concentration 298 g/l was analyzed. The final temperature of the solution was 55° C. and a final pH of 5. According to the analysis, 49 g sodium chloride had formed, well in accordance with the theoretical calculations. The solution obtained has such a quality that it can be used as the feed solution of electrolysis.

We claim:

1. A continuous method for producing alkali metal hydroxide which comprises the steps:

(a) electrolyzing a concentrated aqueous alkali metal chloride solution to form a concentrated aqueous solution of alkali metal hydroxide, to produce chlorine, and to form a dilute aqueous solution of alkali metal chloride, (b) recovering said concentrated aqueous alkali metal hydroxide, (c) regulating the ratio of chlorine to alkali hydroxide produced in steps (a) and (b) by neutralizing an aqueous solution of alkali metal carbonate with at least a portion of the chlorine produced in step (a) to form alkali metal chloride, said alkali metal chloride being utilized together with the dilute aqueous solution of alkali metal chloride formed in step (a) to form a concentrated aqueous alkali metal chloride solution, (d) electrolyzing said concentrated aqueous alkali metal chloride solution to form a concentrated aqueous solution of alkali metal hydroxide, to produce chlorine, and to form a dilute aqueous solution of alkali metal chloride, and (e) recovering said concentrated aqueous alkali metal hydroxide.

2. Method according to claim 1, wherein the aqueous solution of alkali metal carbonate of step (c) further comprises alkali metal chloride.

3. Method according to claim 2, wherein the aqueous solution of alkali metal carbonate and alkali metal chloride of step (c) further comprises alkali metal chlorate.

4. Method according to claim 1, wherein neutralization step (c) comprises adding the alkali metal carbonate to a first solution containing alkali metal chloride and alkali metal chlorate to provide a second solution, supplying chlorine produced in step (a) to said second solution to precipitate alkali metal chloride crystals, separating said crystals from said second solution and the adding said crystals to the dilute aqueous solution of alkali metal chloride formed in step (a) to provide a concentrated alkali metal chloride solution, purifying said concentrated alkali metal chloride solution, and subjecting said concentrated solution to chlor-alkali electrolysis step (d).

5. Method according to claim 4, wherein at least a part of the second solution comprising said alkali metal chloride and said alkali metal chlorate is supplied to at least one of a process for preparing alkali metal chlorate, a process in which alkali metal chlorate is used, a process in which said alkali metal chlorate is transformed to a chloride solution, and a process where said alkali metal chlorate is destroyed.

6. Method according to claim 1, wherein chlorine gas is produced by chlor-alkali electrolysis step (a) and at least part of said gas is employed in step (c).

7. Method according to claim 6, wherein the chlorine gas is purified by liquefying and evaporating the chlorine gas prior to using said chlorine gas in the neutralization.

8. Method according to claim 7, wherein the chlorine gas is fed directly to said aqueous solution of alkali carbonate without purifying said chlorine gas.

9. Method according to claim 1, wherein neutralization step (c) comprises adding the alkali metal carbonate to the solution resulting from chlor-alkali electrolysis step (a) and subsequently neutralizing the carbonate with chlorine gas produced in step (a) to provide a concentrated solution comprising at least 83.9 g/l alkali metal chloride.

10. Method according to claim 9, wherein alkali metal chlorate in the concentrated solution produced in step (c) is transformed into alkali metal chloride.

11. Method according to claim 1, wherein the concentration of the alkali metal chloride solution supplied to chlor-alkali electrolysis step (d) is supersaturated.

12. Method according to claim wherein the pH of the solution in neutralization step (c) is greater than 3.

13. Method according to claim 11, wherein neutralization step (c) is carried out between 20° C. and 100° C.

14. Method according to claim 11, wherein the electrolysis steps are performed in any one of a mercury cathode, diaphragm or membrane cell.

15. A continuous method for producing an alkali metal hydroxide comprising the steps:

(a) electrolyzing a concentrated aqueous alkali metal chloride solution to form a concentrated aqueous solution of alkali metal hydroxide, to produce chlorine, and to form a dilute aqueous solution of alkali metal chloride, (b) recovering said concentrated aqueous alkali metal hydroxide, to form a concentrated aqueous alkali metal chloride solution, (c) regulating the ratio of chlorine to alkali hydroxide produced in steps (a) and (b) by converting at least a portion of the chlorine produced in step (a) to hydrogen chloride and neutralizing an aqueous solution of alkali metal carbonate with hydrogen chloride to form alkali metal chloride, said alkali metal chloride being utilized together with the dilute aqueous solution of alkali metal chloride formed in step (a) to form a concentrated aqueous alkali metal chloride solution, (d) electrolyzing said concentrated aqueous alkali metal chloride solution to form a concentrated aqueous solution of alkali metal hydroxide, to produce chlorine, and to form a dilute aqueous solution of alkali metal chloride, and (e) recovering concentrated aqueous alkali metal hydroxide.

16. Method according to claim 15, wherein neutralization step (c) comprises absorbing hydrogen chloride gas into the dilute alkali metal chloride solution resulting from chlor-alkali electrolysis step (a), adding the alkali metal carbonate to said solution to provide a concentrated alkali metal chloride solution, purifying said concentrated solution to provide a purified solution, and returning said purified solution to chlor-alkali electrolysis step (d).

17. Method according to claim 15, wherein neutralization step (c) comprises adding the alkali metal carbonate to the dilute alkali metal chloride solution resulting from chlor-alkali electrolysis step (a), and thereafter neutralizing the carbonate with hydrogen chloride to provide a concentrated alkali metal chloride solution, purifying the concentrated alkali metal chloride solution to provide a purified solution, and returning said purified solution to chlor-alkali electrolysis step (e).

18. Method according to claim 15, wherein the hydrogen chloride used in neutralization step (c) is obtained from the chlor-alkali electrolysis step (a).

19. Method according to claim 18, wherein at least a part of the chlorine and hydrogen generated in said chlor-alkali electrolysis are reacted to produce hydrogen chloride gas.

20. Method according to claim 19, wherein the hydrogen chloride gas is purified either by liquefying and evaporating the hydrogen chloride gas or by absorbing the hydrogen chloride gas into water to provide a hydrochloric acid solution, and distilling said acid solution to yield purified hydrogen chloride gas.

21. Method according to claim 15, wherein neutralization step (c) comprises adding alkali metal carbonate and hydrochloric acid or hydrogen chloride gas to a solution to thereby precipitate alkali metal chloride crystals, separating said crystals from the solution, and adding said crystals to the dilute aqueous solution of alkali metal chloride formed in step (a) to form a concentrated alkali metal chloride solution.

22. Method according to claim 15, wherein the concentration of the alkali metal chloride solution supplied to chlor-alkali electrolysis step (d) is supersaturated.

23. Method according to claim 15, wherein the pH of the solution in neutralization step (c) is greater than 3.

24. Method according to claim 15, wherein neutralization step (c) is carried out between 20° C. and 100° C.

25. Method according to claim 15, wherein the electrolysis steps are performed in any one of a mercury cathode, diaphragm or membrane cell.

* * * * *

UNITED STATES PATENT AND TRADEMARK OFFICE
CERTIFICATE OF CORRECTION

PATENT NO.  :  5,651,875

DATED  :  July 29, 1997

INVENTORS  :  Suonperä et al.

It is certified that error appears in the above-identified patent and that said Letters Patent is hereby corrected as shown below:

Claim 12, line 1: after "claim" insert --1,--.

Claim 13, line 1: change "11" to --1--.

Claim 14, line 1: change "11" to --1--.

Signed and Sealed this

Eighteenth Day of November 1997

Attest:

BRUCE LEHMAN

*Attesting Officer*  *Commissioner of Patents and Trademarks*